United States Patent [19]

Okada et al.

[11] 3,802,670
[45] Apr. 9, 1974

[54] CONTINUOUS MIXER FOR THERMOPLASTIC RESIN

[75] Inventors: Toshio Okada; Katuma Taniguchi; Kiyoshi Kamimori, all of Hiroshima, Japan

[73] Assignee: Japan Steel Works Ltd., Tokyo, Japan

[22] Filed: Oct. 12, 1971

[21] Appl. No.: 187,951

[30] Foreign Application Priority Data
Nov. 5, 1970 Japan.............................. 45-96867

[52] U.S. Cl...................... 259/192, 259/6, 425/208
[51] Int. Cl............................ B29f 3/02, B01f 7/08
[58] Field of Search............. 259/6, 21, 41, 64, 97, 259/104, 185, 191, 192; 425/208; 415/73, 74; 222/229, 238, 412

[56] References Cited
UNITED STATES PATENTS

| | | | |
|---|---|---|---|
| 3,143,767 | 8/1964 | Wirth et al............... | 259/192 |
| 3,565,403 | 2/1971 | Matsuoka................. | 259/104 |
| 3,317,959 | 5/1967 | List......................... | 259/191 |
| 3,697,190 | 10/1972 | Haentjens................. | 415/73 |
| 3,522,627 | 8/1970 | Vanzo...................... | 425/208 |

OTHER PUBLICATIONS

German Printed Application, Meskat et al., Serial No. F5206IVc/12e, Published 2/23/56

*Primary Examiner*—Harvey C. Hornsby
*Assistant Examiner*—Stuart S. Levy
*Attorney, Agent, or Firm*—Wenderoth, Lind & Ponack

[57] ABSTRACT

A continuous mixer composed of a single barrel and two rotors rotating therein in opposite directions to each other, each of said rotors having formed on it supplying screw threads at the supplying portion as well as two sets of kneading screw threads, at the kneading portion, the one set of the kneading threads being adapted to feed the resin material forwardly and the other rearwardly, the ratio of their lengths being suitably selected depending on the kneading purpose and gaps between both threads. Further, the barrel and each of the rotors are provided with cooperative conical portions beyond the kneading portion and the rotors are shiftable for adjusting the clearances between the conical portions to regulate the kneading effect on the material at the kneading portion.

1 Claim, 7 Drawing Figures

TOSHIO OKADA,
KATUMA TANIGUCHI and
KIYOSHI KAMIMORI,

INVENTORs

BY Wendroth, Lind & Ponack

ATTORNEYs

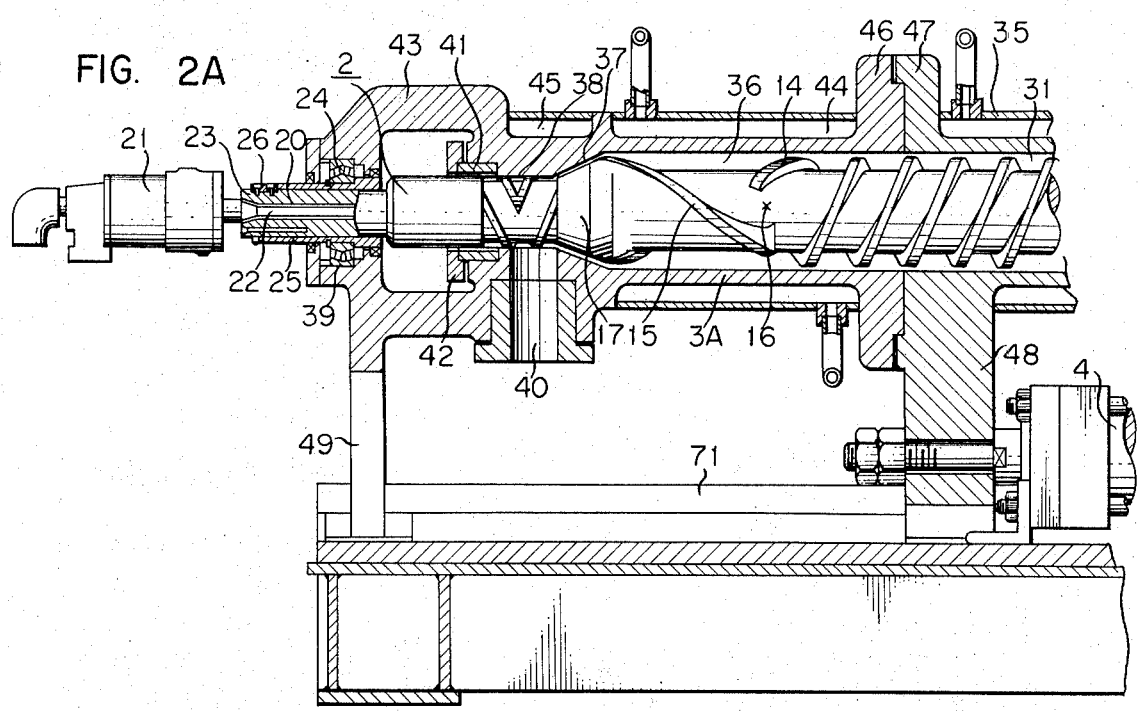

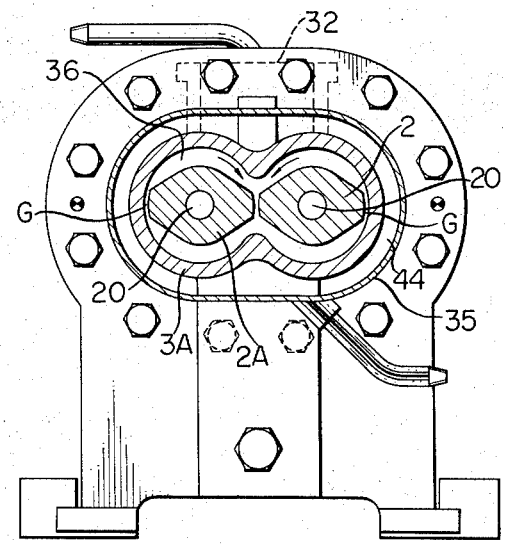
FIG. 3
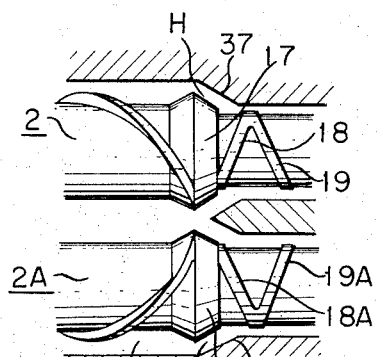
FIG. 4
FIG. 5
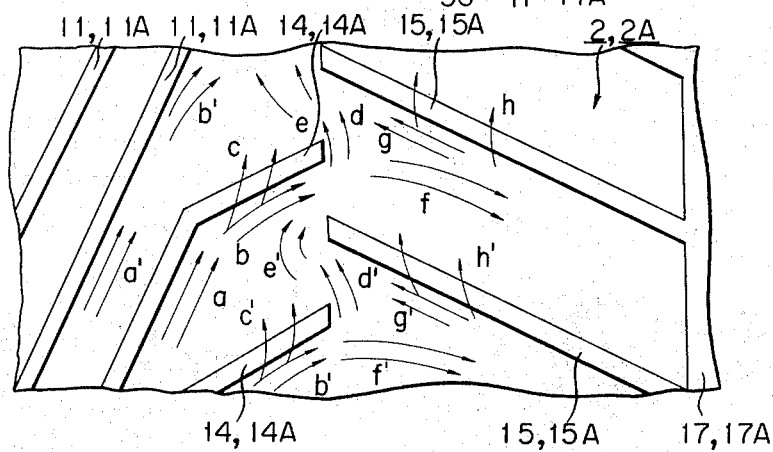

CONTINUOUS MIXER FOR THERMOPLASTIC RESIN

BACKGROUND OF THE INVENTION

This invention relates to a continuous mixer, and more particularly to a continuous mixer for thermoplastic resin in which it is possible to mix the resin continuously and yet in large quantities.

The mixing of thermoplastic resins has hitherto been carried out mostly by batch-type mixers. However, recently such mixers have rarely been used except for special purposes. Further, many continuous mixers which have been developed in attempts to overcome the defects of the batch-type mixers are known. However, since even these known continuous mixers have many defects they do not satisfy the users sufficiently.

Some of these defects are as follows:

1. Most of the continuous mixers have no provision to adjust at will the strength of kneading, corresponding to the kneading time in a batch-type mixer;
2. Most of the continuous mixers have to adjust the kneading by changing the number rotations of the screws or the shapes of the screws of the kneading portions in order to adjust the kneading. Therefore, the range of application is limited or the operation of the mixer must be stopped temporarily to make the adjustments or changes;
3. In the biaxial type continuous mixer, since it is impossible to use large thrust bearings sufficiently strong to resist the thrust generated from the screws during kneading, the processing capacity is relatively small;
4. In most of the continuous mixers, when the screws are rotated at a higher speed, the barrel and the screw threads come into contact and bite each other due to the cantilever construction of the screws, so that it is not possible to rotate the screws at a high speed, resulting in a small capacity;
5. In a continuous mixer such as disclosed in U.S. Pat. No. 3,565,403 in which bearings are provided at the forward ends of the screws, since the resin pressure generated during the kneading is applied to a seal portion for the resin provided at the forward portions of the screws, there is a tendency for the resin to leak or to shorten the life of the seal material.

Further, since production in the resin manufacturing industry has recently had a tendency to increase year after year, and the capacity of the polymerizing equipment is becoming larger and larger, it has, up to now, been necessary to provide several mixing units for each polymerizing unit because of the small processing capacity of each unit of the conventional mixing equipment. Accordingly, the industry greatly desires extruders which have a larger processing capacity per unit so that the production cost can be reduced by reducing the number of extruders which must be used in parallel, space at the factory site can be saved, and personnel expenses can be reduced.

SUMMARY OF THE INVENTION

It is an object of the present invention to provide a continuous mixer for thermoplastic resin which can carry out all of the above three operations continuously by two revolving rotors.

Another object of the present invention is to provide a continuous mixer for thermoplastic resin without qualitative inequality in the resins produced by the batch as is often the case with a batch-type mixer due to a variation in the kneading conditions.

It is a further object of the present invention to provide a continuous mixer for thermoplastic resin which can mix the resin material, additive, pigment, etc. within a completely enclosed chamber so that there is no scattering of dust.

Another further object of the present invention is to provide a continuous mixer for thermoplastic resin which can be operated by a minimum number of personnel during normal operation.

The continuous mixer according to the present invention preferably comprises a barrel, two rotors mounted freely rotatably mounted in said barrel, said barrel being axially shiftable relative to said rotors, means for rotating said rotors in oposite directions, and means for causing relative axial movement of said barrel raltive to said rotors. The barrel has two laterally interconnecting substantially cylindrical and mutually parallel chambers, each chamber having at one end an independent conical portion with a cylindrical portion of a small diameter connected thereto, and a common material supplying orifice is provided at the upper portion of both cylindrical chambers and an independent discharge orifice at the lower portion of each of said cylindrical portions of a small diameter. Each of said rotors has formed, on its outside, in order, a supplying portion having a pair of helical screw threads adapted to feed the material forwardly, a kneading portion having a pair of helical screw threads continuously connecting to said screw threads of said supplying portion to feed the material forwardly and a pair of helical screw threads spaced from said first mentioned screw threads to feed the material rearwardly, a conical portion cooperating with said conical portion of said chamber and a discharge portion having a cylinder cooperating with said cylindrical portion of said chamber. The ratio between the lengths of said forwardly and rearwardly feeding screw threads of the kneading portion is selected as desired, and each of said rotors is supported by said barrel at its forward portion for free rotation as well as axial shifting of said barrel.

Thus, in the continuous mixer according to the present invention, each of the two rotors which are adapted to be rotated in the opposite direction comprises:

1. a supplying portion to feed the material forwardly;
2. a kneading portion to knead the material both microscopically and macroscopically;
3. A conical portion to control the staying time and charging ratio of the material and the pressure applied thereto in the kneading portion as well as finally to carry out the uniform kneading of the material; and
4. a discharge portion to discharge the kneaded material outwardly.

Further, in the kneading portions of the respective rotors, there are provided on the surface two pairs of helical screw threads, that is, one is the helical screw threads to force the material forwardly (hereinafter referred to as the "forward screws"), and the other is to force the material rearwardly hereinafter referred to as the "rearward screws"). The ratio between the lengths of the forward and rearward screws is selected as desired as will be explained more fully, and both pair of screws are discontinuous.

Since the supplying portions of the rotors give the material only a forwardly advancing force, if the material should be forced out only by such a force, there will be no interchanging of the material between the two rotors, and hence the homogeneous quality of the material cannot be obtained, because, even in the same rotor, there are inequalities of temperature and quality between the material passed through the clearances between the tips of the screw threads and the inner surface of the barrel and that which does not pass through the clearances. Accordingly, in order to promote the macroscopic kneading of the material, in the kneading portions of the rotors screw thread profiles that can disturb the material are required. In the present invention, to facilitate this disturbance in the material flow, the ratio between the axial lengths of the forward and rearward screws is selected to have a specific value and yet both screws are made discontinuous.

As to this point, it will be appreciated that this ratio should be suitably selected depending upon the object of the kneading. That is, if the lengths of the rearward screws are selected so as to be greater than those of the forward screws, the degree of the disturbance in the material flow is made large, and, at the same time, the material is subjected to a larger shearing force to increase the kneading effect. Therefore, if the object is to produce the strongest kneading effect, longer rearward screw lengths should be selected.

However, to when the rearward screws are lengthened this has such as adverse effect on the material that its processing performance is reduced. Accordingly, when the processing performance is to be given priority, it is preferable to increase the axial lengths of the forward screws relative to those of the rearward screws.

Thus, it should be noted that the ratio between the lengths of the forward and rearward screws must be selected so as to be the to a most adequate one depending on whether the kneading effect is to be given priority or the processing performance is to be given priority.

As stated above, the material which has been fully kneaded at the kneading portions of the rotors is given a microscopic kneading while it passes through the conical portions so that the material is finally homogenized.

The following are the constructional features of the present continuous mixer.

In general, in the conventional batch-type mixer, the regulation of the kneading effect is done by the adjustment of such items as the number of rotations of the rotors or rolls, the kneading time for the material, or the clearances between the rotors or rolls in the case of the double-rotor type mixer, and, among these, the most effective is the adjustment of the time. Nevertheless, in the hitherto known double-rotor type continuous mixers, the regulation of the kneading effect is carried out by the adjustment of the number of rotations of the rotors or by the changing of the profiles of the screws at their kneading portions, so that such disadvantages result as limitation of the field of application or inability to carry out the regulation unless the operation is stopped. Contrary to this, in the apparatus of the present invention, the rotors and the barrel are both provided with conical portions ahead of the kneading portions so that, when the barrel is shifted back and forth relative to the rotors, the clearances between the conical portions are adjusted to effect the regulation of the kneading effect. By means of this regulation of the clearances, the staying time of the material, its charging ratio and the pressure applied to it in the kneading portions, etc. are adjusted, whereby great versatility of the mixer is obtainable. Further, in this case, when the shift of the barrel is performed by a hydraulic cylinder, the adjustment of the clearances between the conical portions can be done at any time even though the mixer is in operation.

In the present invention, the forward end portions of the respective rotors are supported by bearings so as to eliminate the fear of the rotors coming into contact with the inner surface of a barrel, so that the construction allowing the rotors to rotate at a sufficiently high number of rotations can be provided.

The processing capacity is generally influenced most by the number of revolutions of the rotors, so the continuous mixer according to the present invention raises the processing capacity greatly, because it can make it possible to raise the number of revolutions of the rotors by supporting them also at their forward end portions.

In this respect, it will be also noted that, when bearings are provided at the forward end portions of the rotors too, sealing is required for preventing molten material from entering the bearings, but, in the present invention, the sealing can be constructed so as to be independent of the material pressure by giving the discharging orifices sufficiently large areas.

BRIEF DESCRIPTION OF THE DRAWINGS

These and other objects of the present invention will become more apparent to those skilled in the art when considered in reference to the following detailed description in the light of the accompanying drawings in which like numerals indicate like parts throughout the figures thereof, and wherein:

FIGS. 2A and 2B are sectional elevational views of the embodiment shown in FIG. 1;

FIG. 3 is a transverse sectional view of the embodiment taken along the line III — III of FIG. 1;

FIG. 4 is an enlarged partial sectional view of a portion of the embodiment indicated by a dot-dash circle IV in FIG. 1; and FIG. 5 is developed plan view of the kneading portion of one of the rotors to diagrammatically show the flow of the material when it is being kneaded.

DESCRIPTION OF A PREFERRED EMBODIMENT

The embodiment of the continuous mixer according to the present invention is composed of mainly a reduction gear, rotors, a barrel and a pressure cylinder.

The particulars of the above respective constitutional components will be described fully as follows:

1. The reduction gear

The torque from an electric motor etc. is transmitted to the rotors by means of a power transmission coupling (not shown) through the reduction gear.

Figure 1A:
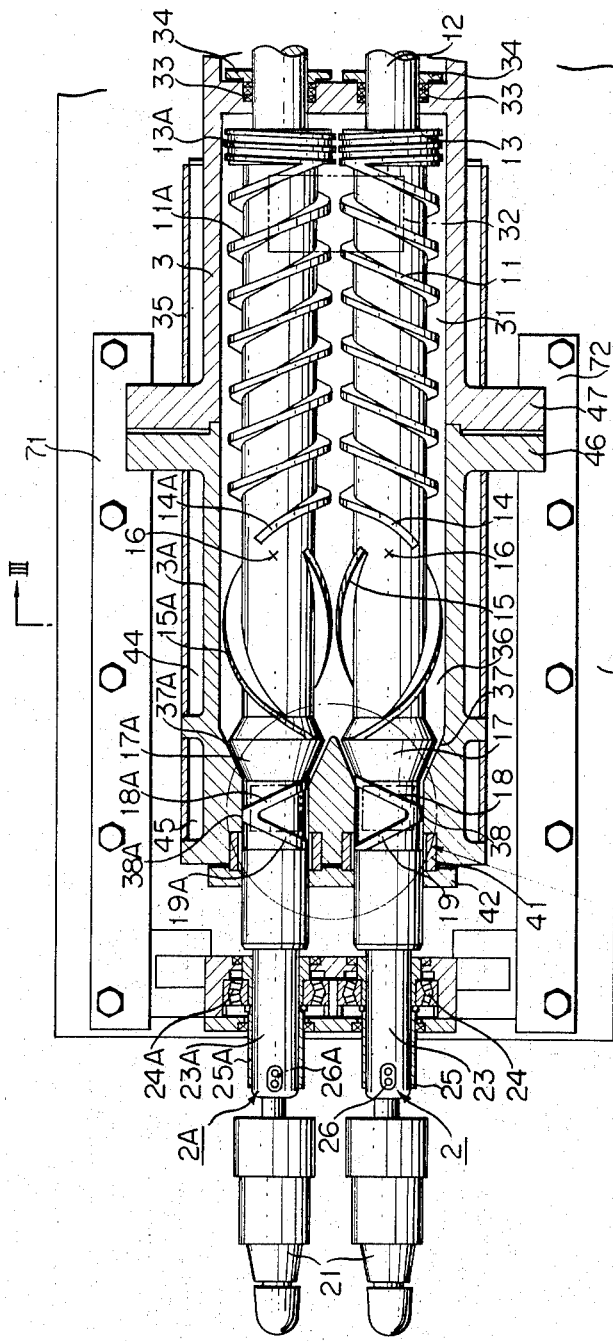
FIGS. 1A and 1B are sectional plan views of a preferred embodiment of a continuous mixer according to the present invention.

Referring to FIGS. 1 and 2, the reduction gear 1 comprises sleeve shafts 51, 52, radial bearings 53, 54 and 55, 56 to receive the torque of the sleeve shafts, thrust bearings 57, 58 to receive the thrust from the sleeve shafts, gears 59, 60 respectively keyed to the sleeve shafts 51, 52 and upper and lower housings 61, 62 for supporting these elements. The gear 59 meshes with the gear 60 so that the torque transmitted to the sleeve shaft 51 through the power transmitting coupling is transmitted to the sleeve shaft 52 and, at the same time, both shafts 51 and 52 are rotated in the opposite direction to each other, whereby the rotation ratio between the sleeve shafts 51, 52 can adjusted by a suitable selection of the gear ratio.

Thus, the reduction gear 1 acts to give the respective sleeve shafts 51, 52 torque in counterclockwise and clockwise directions of rotation respectively as viewed from the left in FIG. 1, and, at the same time, to receive the reaction torque transmitted from the rotors.

The torque of the sleeve shafts 51, 52 is respectively transmitted to the rotors 2, 2A through splined coupling members 63, 64 respectively formed at the forward end portions of the sleeve shafts.

2. ROTORS

Referring to FIGS. 1 and 2, the rotors 2, 2A are arranged in parallel relation with each other, and are rotated in the opposite direction through the sleeve shafts 51, 52, and the rotors are disposed in such a manner that the circles described by the outermost surfaces of the respective rotors when they are rotated do not intersect. For this purpose, the rotors 2, 2A are respectively provided with splined coupling numbers 63', 64' at their rear end portions engaged with the splined coupling members 63, 64 of the sleeves 51, 52, and the respective pairs of the splined coupling members are firmly secured by nuts 10.

Each of the rotors 2, 2A has a pair of feeding helical screw threads 11 or and 11A respectively on a portion lying under a hopper port 32 of the barrel 3, which screws threads are displaced 180° from each other. The feeding helical screw threads 11 and 11A have respectively a sufficient length that they can give the material to be kneaded thrust force so that the material melted at the kneading portions of the rotors is not pushed back by the pressure at the other end portions of the rotors. Between the screw threads 11 and 11A on each of the rotors 2, 2A and the coupling members 63' and 64' is formed a screw thread 13 and 13A respectively having a small pitch so that the quantity of the material pushed back into the sealing portion 12 of the rotor is kept to a minimum.

The helical screw threads 11 and 11A extend along the shaft without interruption and have at the downstream end helical screw thread portions 14 and 14A. The rotors 2 and 2A are further provided with a pair of helical screw threads 15 and 15A forwardly of the screw thread portions 14 and 14A with gaps 16 between the screw threads and the screw thread portions, and the directions of the respective screw threads and helical screw thread portions are different from each other, i.e. the direction of screw thread 15 is different from screw thread portion 14, and the direction of screw thread 15A is different from screw thread portion 14A.

These helical screw thread portion-screw thread pairs 14, 15 and 14A, 15A constitute kneading portions of the rotors. The helical screw thread portions 14 and 14A are those which feed the material forwardly when the rotors rotate, and are henceforth called forward helical screw thread portions, while the helical screw threads 15 and 15A are those which feed the material rearwardly when the rotors rotate and are henceforth called rearward helical screw threads. In the present invention, the ratio between the lengths of the screw thread portion 14 and 14A and those of the screw threads 15 and 15A is appropriately selected so that the material fed by the feeding screw threads 11, 11A and that pushed back by the screw threads 15, 15A is interchanged with each other at the kneading portions, where the macroscopic intermingling of the material takes place effectively. Further, since the screw thread portion 14 and 14A and the screw threads 15 and 15A are discontinuous with gaps 16 between them, disorder occurs in the flow of the material at the gaps 16, resulting in macroscopic kneading of the material which is made to take place easily.

The rotors 2 and 2A each have a conical portion 17 and 17A formed at the forward end portion of the screw threads 15 and 15A so that, when the barrel 3 or 3A is moved forwardly or rearwardly relative to the rotor 2 or 2A, the gap between the conical portion 17 or 17A of the rotor and a conical portion 37 or 37A of the barrel 3A is regulated as will be seen in FIG. 4.

Further, the rotors 2 and 2A each extend forwardly from the conical portion 17 and 17A so as to form a discharging portion that is provided with continuous pair of screw threads 18 and 18A to feed the material forwardly and a pair of screw threads 19 and 19A to push the material rearwardly. The screw threads 18 and 18A serve to force the material toward the respective discharge orifices 40 and the screw threads 19 and 19A to prevent the material from flowing into the sealing portions provided at the forward end of the rotors.

The outer diameters of the screw threads 18 and 18A and 19 and 19A are made smaller than those of the feeding screw threads 11 and 11A.

The rotors 2 and 2A each have central elongated small holes 20 for supplying cooling water or steam axially therethrough. The water or steam fed from the outside into the hole 20 by a revolving coupling 21 of any known type mounted on the forward end of the rotor 2 or 2A is led to the vicinity of its rear end via a syphon pipe 22 extending into the hole 20 and is then discharged outwardly through the revolving coupling 21.

The rotors 2 and 2A are each further provided with a forward end portion 23 and 23A having a small outer diameter forwardly of the discharging portion, and interposed between the end portions 23 and 23A and radial ball bearings 24 and 24A mounted in the forward barrel 3A are sleeves 25 and 25A so that the bearings 24 and 24A are not affected when the barrel 3A is shifted axially. The weight of the rotors 2 and 2A is supported by the radial ball bearings 24 and 24A through the sleeves 25 and 25A which are keyed to the rotors by keys 26 and 26A.

3. Barrel

The barrel according to the present invention comprises a rear barrel portion 3 and a front barrel portion 3A. In the rear barrel portion 3, there is provided a feeding chamber 31 comprising two cylinders parallel with each other and being transversely communicating with each other. Provided above both cylinders so as to extend over them is a common hopper port 32 for feeding the material into the feeding chamber 31.

At the rear part of the feeding chamber 31, there are formed two independent cylinders, each having a smaller diameter than that of the feeding chamber and being provided seal packings 33, each secured by a gland 34, to prevent the material or nitrogen gas etc. from leaking to the outside. Over the outside of the barrel portions 3 and 3A there is provided a jacket 35 for cooling the supplying chamber 31 in order that the material fed into the chamber 31 is not melted at the hopper 32 so that the biting of the material by the feeding screw threads 11 and 11A is not made worse.

The front barrel portion 3A comprises a kneading chamber 36, two independent conical portions 37, 37A, two independent extruding portions 38, 38A, a bearing housing 39 and two discharge orifices 40. The kneading chamber 36 is a continuation of the feeding chamber 31 forwardly and is composed of two cylinders transversely communicating with each other as shown in cross sectional view in FIG. 3. The conical portions 37, 37A, are formed from two independent conical sections located in front of the kneading chamber 31, each of the conical sections converging from the inner diameter of the kneading chamber to that of the extruding portion 38, 38A locating forwardly of the conical section. The extruding portions 38, 38A are two independent cylinders, each having a rectangular discharge orifice 40 at its underside.

Disposed within each of the cylinders of the extruding portion 38 at its forward portions is a labyrinth packing 41, secured by a gland 42, to prevent the leakage of the material through the portions 38, 38A. The bearing housing 39, supported by ribs 43 extending from the forward end of the front barrel portion 3A has radial ball bearings 24, 24A in it to support the forward end portions of the rotors 2, 2A for rotation.

Mounted around the kneading chamber 36, the extruding portions 38, 38A and the discharge orifices 40 are jackets 44 and 45 to be supplied with steam or water. The front and rear barrel portions 3A, 3 are firmly secured together by flanges 46 and 47 and bolts and nuts (not shown), and both barrel portions are slidably supported on a frame 70 by means of a leg portion 48 on the flange 47 of the rear barrel portion 3 and a leg portion 49 on the front barrel portion 3A.

4. Pressure cylinder

A piston of the pressure cylinder 4 mounted on the frame 70 is connected to the rear barrel portion 3 at the leg portion 48 so that the forward or rearward movement of the piston of the cylinder 4 is transmitted to the rear and front barrel portions 3 and 3A for the adjustment of the gaps H formed between the conical portions 17, 17A of the rotors 2, 2A and the conical portions 37, 37A of the front barrel portion 3A. In order that the center lines of the barrels 3, 3A and the rotors 2, 2A remain in coincidence with each other when the barrel portions 3 and 3A are shifted forwardly or rearwardly, the legs 48, 49 are guided by guides 71 and 72 secured to the frame 70. In addition, a guide 65 is provided in front of the reduction gear 1.

In order to enable persons to better understand this invention, we will briefly explain the operation of it.

Figure 1B:
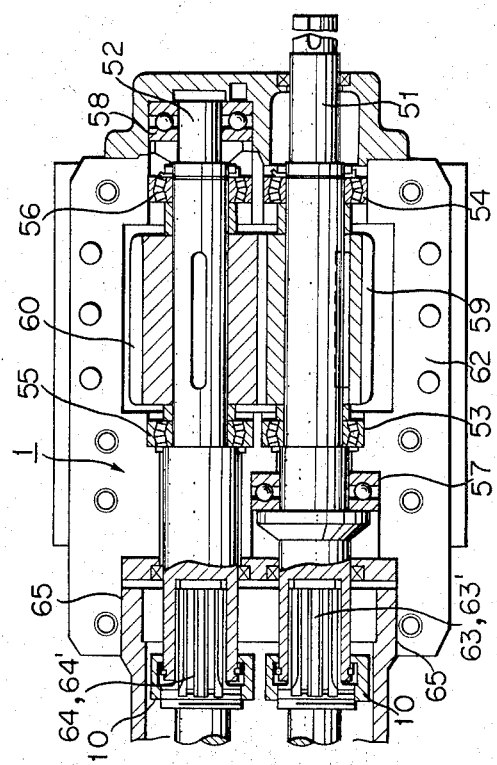

When the torque from the motor (not shown) is transmitted to the sleeve shaft 51 through a power transmission coupling (not shown) the sleeve shaft 52 is also given a rotation through the gears 59, 60 in the direction opposite to that of the sleeve shaft 51. Thus the directions of rotation of the two sleeves are such that they rotate inwardly toward each other as seen in FIG. 1B and these rotations are directly transmitted to the rotors 2, 2A through the splined coupling members 63, 64 and 63', 64' so that the rotors 2, 2A are rotated inwardly toward each other as shown by the arrows in FIG. 3.

Thrust force from the rotors 2, 2A is received by the thrust bearings 57, 58 respectively mounted on the sleeve shafts 51, 52. At this point, it will be appreciated that since the forward end portions of the rotors 2, 2A are supported by the radial bearings 24, 24A, the rotors 2, 2A can be rotated with a much higher speed than that attained in the conventional extruders.

The material fed through the hopper port 32 is fed by the feeding helical screw threads 11, 11A of the rotors 2, 2A to the kneading chamber 36 of the barrel 3A. Now the flow of the material within the kneading chamber 36 will be explained fully in conjunction with FIG. 5.

The material flow caused by the two feeding helical screw threads 11, 11a is divided into two flows $a$ and $a'$. These flows $a$, $a'$ become flows $b$, $b'$ when the flow reaches the forward ends of helical screw thread portions 14, 14A, and these flows $b$, $b'$ differ from the flows $a$, $a'$ only in the flow direction. In this case, a part of the flows through the gaps between the forward helical screw thread portions 14, 14A and the inner surface of the barrel portion 3A as shown by the flows $c$, $c'$ and are subject to strong shearing force when they pass through the gaps so that the microscopic kneading of the material is promoted. On the other hand, at the tip portion thread portions of the forward helical screw threads 14, 14A a part of the flows $b$, $b'$ are converted into the flows $d$, $d'$ to join the flows $b'$, $b$, whereby the macroscopic kneading of the material is promoted. Thus it will be noted that, by making the forward helical screw thread portions 14, 14A and rearward screw threads 15, 15A discontinuous, the flow $d$, $d'$ is generated to promote the macroscopic kneading of the material.

The material which is brought together the intersection of the forward helical screw thread portions 14, 14A and rearward screw threads 15, 15A become the flows $f$, $f'$ and are urged toward the conical portions 37, 37A. At the areas closest to the front portions of the rearward helical screw threads 15, 15A there is generated flows $g$, $g'$ to force the material rearwardly. Since the direction of the flows $f$, $f'$ is opposite to that of the flows $g$, $g'$, strong shearing force is applied to the material so that its macroscopic kneading is also promoted. A part of the flows $f$, $f'$ is changed to flows $h$, $h'$ which pass through the gaps G (FIG. 3) between the rearward helical screw threads 15, 15A and the inner surface of the barrel portion 3A. These flows $h$, $h'$ are more easily generated than the flows $c$, $c'$ generated by the forward helical screw thread portions 14, 14A.

As stated above, the shearing force most effective in the kneading operation on the material is given by the flows $h$, $h'$ and $c$, $c'$. Among the flows, since the flows h, h' are more easily generated, the longer the lengths of the rearward helical screw threads 15, 15A the higher the kneading effect in the material. However, it should be noted that if the lengths of the rearward screw threads 15, 15A are made too long, the counter flows g, g' are increased to decrease the processing performance.

In the present invention, experiments have been made by varying the ratio of the lengths of the forward thread portions 14, 14A to those of the rearward screw threads 15, 15A, the results being shown in the Table. The experiments were made under the following conditions:

| | |
|---|---|
| rotor diameter: | 120 mm |
| rotor revolutions: | 500 rpm |
| gap H of the conical portions measured in the axial direction: | 5 mm |
| material: | Polypropylene |

TABLE

| Lengths of the forward screw threads: Lengths of the rearward screw threads: | Specific energy kwh/kg | Extruded quantity kg/h |
|---|---|---|
| 3 : 1 | 0.13 | 500 |
| 1 : 1 | 0.14 | 450 |
| 1 : 3 | 0.16 | 400 |

In the Table, the specific energy represents the electrical power consumed by the unit weight of the material, and it is commonly used a a numerical value showing the degree of kneading.

As apparent from the Table, when the lengths of the rearward screw threads are greater than those of the forward screw thread portions, a stronger kneading effect is given to the material. The reason why the specific energy becomes larger in this case is in that the flows h, h' as shown in FIG. 5 are increased. However, it should be noted that when the lengths of the rearward threads are larger, the processing performance is decreased as apparent from the Table.

Thus, in the continuous mixer according to the present invention, any desired kneading effect can be given to the material by the suitable selection of the ratio of the lengths of the forward thread portions to those of the rearward threads. In other words, if it is desired to promote the processing performance, the lengths of the forward thread portions should be made larger, while, if it is desired to carry out the effective kneading, the lengths of the rearward threads have to be made larger.

The staying time, charging ratio, pressure etc. of the material in the kneading chamber are easily regulated by the adjustment of the gaps between the conical portions 17, 17A and 37, 37A by the operation of the pressure cylinder 4.

In addition to the regulation, the ultimate homogenizing of the material is performed at the conical portions 17, 17A and 37, 37A. The material forced out through the gaps H between the conical portions 17, 17A and 37, 37A is extruded outwardly through the discharge orifices 40 by the action of the screw threads 18, 18A and 19, 19A of the extruding portions, whereby since the cross sectional areas of the orifices 40 are selected so as to be sufficiently large, the material does not leak out through the labyrinths 41 provided at the front end portions of the rotors 2, 2A. In operation, water is continuously supplied to the jacket 35 of the rear barrel portion 3 so that the biting of the material by the helical screw threads of the rotors at the material supplying portion is not impeded by the melting of the material. Further, heated medium or cooled medium, as the case may be depending on the object of the kneading, is fed to the jackets 44, 45 and the holes 20 of the rotors.

The continuous mixer according to the present invention has such a construction and operation as described above, and, the effects obtainable by the mixer can be summarized as follows:

1. Since the front end portion of each of the rotors is supported by the radial ball bearings, the rotors can be rotated at a higher speed, so that the processing performance is increased, and, at the same time, the shearing force applied to the material at the kneading portion is great.

2. By selecting the ratio of the lengths of the forward screw thread portions of the kneading portion to those of the rearward screw threads properly, the material can be caused to pass easily through the gaps G (FIG. 3) between the tips of the rearward screw threads and the inner surface of the front barrel portion so that the microscopic kneading of the material is fully carried out, or, otherwise, by increasing the lengths of the rearward screw threads relative to those of the forward screw thread portions the flow of the material can be easily disordered so that the material can be fully subjected to macroscopic kneading.

3. By making the forward screw thread portions and rearward screw threads of the kneading portion discontinuous, macroscopic kneading of the material is promoted.

4. By the adoption of a construction in which conical portions are provided at the forward part of the kneading portion and making the gaps between the rotors and the barrel at these conical portions adjustable, the staying time, charging into or pressure of the material at the gaps can be so regulated that the optimum kneading action is given to the material. (This means that the mixer according to the present invention can be utilized widely in many fields of application, from those requiring a weak kneading effect to those requiring a strong one as compared with the hitherto known batch-type mixers wherein the kneading effect is regulated by varying the kneading time.)

5. During the passing of the material through the conical portions, the material is subject to further microscopic kneading so that the ultimate homogenizing of the material can be promoted.

6. Since the dimensions of the discharge orifices can be made sufficiently large, the leakage of the material through the labyrinths provided at the forward end portions of the rotors can be nearly completely prevented.

7. Since each of the rotors comprises a supplying portion to supply the material to the kneading portion, a kneading portion to give the material macroscopic as well as microscopic kneading, a conical portion to regulate the degree of the kneading of the material at the kneading portion as well as to ultimately homogenize the material and an extruding portion to extrude the material outward, the material fed into the supplying portion of the rotors through the hopper is continuously kneaded and extruded through the discharge orifices.

What is claimed is:

1. A continuous mixer for thermoplastic resin, comprising a barrel, two rotors rotatably mounted in said barrel, rotating means coupled to said rotors for rotating said rotors in the opposite directions from each other, said barrel being axially shiftable relative to said rotor, said barrel having in succession a supply portion and a kneading portion, comprising two laterally interconnecting substantially cylindrical and mutually parallel chambers in which said rotors are respectively mounted having a common material supplying orifice at the upper portion of one end of said cylindrical chambers, said barrel further having two independent conical barrel portions opening out of the other ends of said cylindrical chambers and two independent discharging portions, one opening out of each of the conical barrel portions, each of said rotors having thereon feeding helical screw threads in said supplying portion, forward kneading helical screw thread portions and rearward kneading helical screw threads in said kneading portion, said forward kneading helical screw thread portions being discontinuous from said rearward kneading helical screw threads so that there are gaps between them in the axial direction of said rotors, a conical rotor portion cooperating with the respective conical barrel portions, and a front journal portion, two bearings in said barrel, one supporting each of the respective front journal portions of said rotors, seal means around each rotor between the discharge portion of said barrel and said bearing, each discharge portion having a discharge opening opening out of the discharge portion immediately adjacent said conical barrel portion, the space in said discharge portions with said discharge openings being greater than the space between the rotors and the barrel in said conical barrel portions, and barrel shifting means coupled to said barrel for shifting said barrel, whereby the rotors can be rotated at high speed while being supported at the journal portions, there is little pressure of the material being kneaded on said seal means and that the passages for the resin constituted by the conical portions of the barrel and the rotors can be continuously adjusted to change the staying time, charging ratio or pressure of the resin at the kneading portion for rotating optimum kneading conditions.

* * * * *